(12) United States Patent
Yajima et al.

(10) Patent No.: US 6,290,172 B1
(45) Date of Patent: Sep. 18, 2001

(54) SUPER-PRESSURE BALLOON AND METHOD OF MANUFACTURING THE SAME

(75) Inventors: Nobuyuki Yajima; Naoki Izutsu, both of Sagamihara (JP)

(73) Assignee: The Director-General of the Institute of Space and Astronautical Science, Sagamihara (JP)

( * ) Notice: Subject to any disclaimer, the term of this patent is extended or adjusted under 35 U.S.C. 154(b) by 0 days.

(21) Appl. No.: 09/346,998

(22) Filed: Jul. 2, 1999

(30) Foreign Application Priority Data

Jul. 10, 1998 (JP) .................................. 10-195633

(51) Int. Cl.$^7$ ...................................... B64B 1/40
(52) U.S. Cl. ........................................... 244/31
(58) Field of Search .................. 244/31, 33, 126, 244/128

(56) References Cited

U.S. PATENT DOCUMENTS

| | | | |
|---|---|---|---|
| 2,767,941 | * 10/1956 | Gegner et al. | 244/31 |
| 2,919,082 | * 12/1959 | Winzen et al. | 244/31 |
| 2,919,083 | * 12/1959 | Suomi et al. | 244/31 |
| 2,960,282 | * 11/1960 | Winzen | 244/31 |
| 3,041,013 | * 6/1962 | Froehlich | 244/31 |
| 3,109,612 | * 11/1963 | Winker et al. | 244/31 |
| 4,434,958 | 3/1984 | Rougeron et al. | |

OTHER PUBLICATIONS

J.H. Smalley, Proceedings, Sixth ARCRL Scientific Balloon Symposium, pp. 167–176, "Development of the E–balloon," 1970.

* cited by examiner

Primary Examiner—Peter M. Poon
Assistant Examiner—Kevin Jakel
(74) Attorney, Agent, or Firm—Oblon, Spivak, McClelland, Maier & Neustadt, P.C.

(57) ABSTRACT

Based on a shape of gores of the Natural-Shaped Balloon, side edge parts of gores having a large width and a large length are connected to load tapes of a length equal to a circumferential length of a side edge part of the gores of the Natural-Shaped Balloon, in a state that wrinkles are formed uniformly and shortened on the side edge parts of the gores. As these gores are swollen out from between the load tapes from the beginning, the radius of curvature of the gores becomes small and the tension against the internal pressure of gas within a gas bag becomes small, so that higher pressure resistance is obtained. Further, a manufacturing method of the present invention is for connecting the side edge parts of the gores with the load tapes while shortening the length of the side edge parts. Thus, it is possible to efficiently manufacture this super-pressure balloon.

16 Claims, 7 Drawing Sheets

SUPER-PRESSURE BALLOON AND METHOD OF MANUFACTURING THE SAME

BACKGROUND OF THE INVENTION

The present invention relates to a super-pressure balloon for flying at a high altitude such as an observation balloon in the stratosphere and the like. Particularly, the present invention provides a super-pressure balloon equipped with a gas balloon having a structure capable of bearing a higher internal pressure and capable of flying at a higher altitude for a longer time, and a method of manufacturing this super-pressure balloon.

There has conventionally been a large scientific observation balloon for flying in the stratosphere at an altitude of about 30 km to 40 km, for example. Such a high-altitude balloon has a gas bag inflated as the balloon goes up in the sky, and the capacity of the gas bag becomes a maximum when the balloon reaches a maximum altitude. At this time, a gas of free buoyancy of about 10% of the total weight is discharged from a discharge opening formed at a lower part of the gas bag, so that the balloon flies by maintaining a constant height.

However, as the temperature of the gas within the gas bag lowers at sunset, the buoyancy of the gas decreases by about 7 to 10% of the total buoyancy, and the height of the balloon is lowered. Accordingly, in order to maintain the height of the balloon at a constant level after sunset, it is necessary to compensate for a reduction in the buoyancy by dropping the ballast. Therefore, in the case of a balloon for flying over long hours such as several days, for example, it is necessary to load in advance a large volume of ballast on the balloon for maintaining the high altitude as described above.

For example, in the case of a scientific observation balloon for making a round trip on the schedule of about ten days after a start up of the flying at the South Pole by placing the balloon in the circumferential wind blowing in the stratosphere in summer season, approximately a half of loaded weight of 300 kg was for the ballast weight for maintaining the high altitude.

With the above background, it has been desired to decrease the above-described ballast consumption to enable the balloon to fly over long hours and to increase the payload. As means for satisfying this desire, there is available what is called a super-pressure balloon equipped with a pressure-resistant gas bag.

This super-pressure balloon is equipped with a pressure-resistant gas bag that can bear an internal pressure, so that even after the capacity of the gas bag has become a maximum after reaching a maximum height, the balloon does not discharge gas for the ascending buoyancy but maintains a horizontal flying at a constant height after once the buoyancy decreases due to a reduction in the atmospheric density, while maintaining a maximum capacity of the gas bag and an internal gas pressure. According to this super-pressure balloon, the maximum capacity of the gas bag does not change except the gas pressure within the gas bag is lowered when the temperature of the gas lowers after sunset, so that the balloon can maintain the horizontal flying while keeping the maximum height without dropping the ballast. Accordingly, it becomes possible to make the balloon fly over a longer period of time without consuming a large volume of ballast unlike the conventional balloon, and the payload also increases.

In order to achieve the super-pressure balloon as described above, it is necessary to provide a pressure-resistant gas bag that can endure the internal pressure. For increasing the pressure resistance of the gas bag, a film material of lighter weight and higher strength may be used. However, with a film material currently developed, it has been difficult to manufacture a large pressure-resistant balloon having a gas bag of 100,000 cubic meters for capacity and about 100 m for radius.

Therefore, in order to provide a super-pressure balloon of a larger size and a larger capacity, it is necessary to develop a structure of the gas bag that can bear a higher internal pressure as well as to develop a film material.

For facilitating the understanding of the present invention, a general structure of the balloon will be explained below with reference to FIGS. 16 to 18. In the drawings, a reference numeral 1 denotes a gas bag, and helium or the like is filled within this gas bag 1, to generate buoyancy. Payload including an observation device 2 and others is loaded on this gas bag 1. In the actual balloon, various kinds of control devices for carrying out gas discharging and ballast dropping, etc. are loaded, but they are omitted from the drawings.

The gas bag 1 has a schematically spherical shape, and is structured by connecting a large number of gores 3 that are the gas bag 1 vertically and equally divided into N spindle-shaped film pieces, as shown in FIG. 18. These gores 3 are formed by a light-weight and high-strength film material such as a woven cloth or a plastic film, with both side edge parts of the gores 3 mutually sewed or connected together, thereby to structure the gas bag 1. Further, load tapes 4 that can endure a high tension are sewed along the sewing or connection lines of these gores 3. These load tapes 4 increase the mutual connection strength of the gores 3, disperse the load of the observation device 2 and others and transmit this load to the gores 3, and also maintain the shape of the gas bag 1 in a predetermined shape.

Usually, a shape called Natural-Shaped Balloon is used for this gas bag 1. This Natural-Shaped Balloon is a shape which is so prescribed that tension is generated only in a vertical direction of a film material, that is, in the meridian direction, in a state that the buoyancy of the inside gas, the weight acting upon each part of the film material and others are balanced, and no tension is generated in a circumferential direction orthogonal with this vertical direction. In other words, the following relationship is obtained:

$$Tm = P \cdot Rm + dWm \tag{1}$$

where, Tm represents a tension in a vertical direction of an optional part of the film material, P represents a pressure acting upon the film material, Rm represents a radius of curvature of this part of the film material, and dWm represents a component force in a film tangential direction of the gravity acting upon a fine part of the film material.

In this case, the pressure P acting upon the film material at a position in a vertical direction y becomes a sum of a pressure generated by a difference d ρ between a density of the gas within the gas bag and a density of the atmospheric air and a bias pressure P0 at a bottom part of the gas bag, with a gravity acceleration given as g. This relationship is given by the following expression:

$$P = P0 + d\rho \cdot g \cdot y \tag{2}$$

When a shape of the gas bag is expressed by a function y=f (x), the radius of curvature Rm in the vertical direction of the film material is given as follows:

$$Rm = (1 + y'2)3/2/y'' \tag{3}$$

Accordingly, by preparing a differential equation of y by using the above (3) in the expression (1) and by integrating from the bottom part of the gas bag while building the dWm component into the tension Tm, it is possible to obtain the Natural-Shaped Balloon of the gas bag.

In the present specification, it is assumed that the Natural-Shaped Balloon is a shape that is determined by the above relationships (1) to (3) and, as described above, that is so prescribed that tension is generated only in a vertical direction of a film material, that is, in the meridian direction, in a state that the buoyancy of the inside gas, the weight acting upon each part of the film material and others are balanced, and no tension is generated in a circumferential direction orthogonal with this vertical direction.

When it is assumed that the film material that structures the gores 3 does not expand at all, the shape of the cross-sectional surface of the gas bag 1 becomes polygonal, with the cross-sectional shape of each gore 3 forming a linear shape represented by a two-dot chain line 3a, as shown in FIG. 17. However, as the film structuring these gores 3 expands in actual practice, the cross-sectional shape of the gas bag 1 becomes circular as represented by a solid line in FIG. 17 due to the inside gas pressure. Further, when these gores 3 are further stretched, each gore 3 swells out in approximately an arc shape as represented by a broken line 3b in FIG. 17, and load is applied to each load tape 4 to swell it out. However, this load is supported by the tension of the load tape 4.

When the internal pressure is applied to the gas bag 1, the tensile stress generated to the film material becomes proportional to the radius of curvature of the swell-out of this film material. Accordingly, when the swell-out 3b of each gore 3 shown in FIG. 17 is set larger, that is, when the radius of curvature of each gore 3 is set smaller, the pressure resistance of the gas bag against the internal pressure becomes higher, and this is advantageous in manufacturing the above-described super-pressure balloon.

However, according to the conventional balloons, there has been a limit to the expansion or stretching of the film material that structures the gores 3 although the swell-out of the gores 3 depend on the stretch of the film material. Therefore, it has not been possible to make larger the swell-out of the gores 3, or it has not been possible to make sufficiently smaller the radius of curvature.

As a method of making larger the swell-out of the gores 3, there is a one, as shown in FIG. 19, for cutting out portions 3c represented by shaded lines in the gore 3 and then sewing or connecting together the left edge parts of the gore 3 to form a three-dimensionally shaped gore 3. These gores 3 are sewed or connected together, in a manner as explained above, to form a gas bag.

A balloon obtained by this method as a result, however, has a large number of sewing lines and connection lines in each gore 3. Therefore, the strength of each gore is lowered and the weight of each gore 3 increases. Further, there is also an increasing risk of generation of leakage and others, which leads to a reduction in reliability. This balloon also has an extremely increased number of manufacturing processes and involves an inconvenience of increased manufacturing cost.

BRIEF SUMMARY OF THE INVENTION

The present invention has been made in the light of the above situations, and it is an object of the present invention to provide a balloon which has increased pressure resistance of a gas bag by making smaller the radius of curvature of a gore film material, which is simple in structure and can be manufactured easily and which has high reliability, and a method for manufacturing this balloon.

In order to achieve the above object, according to one aspect of the invention, there is provided a super-pressure balloon of the Natural-Shaped Balloon of which gores are prescribed to have sizes such that tension is generated in only a vertical direction of a film material of the gas bag and no tension is generated in a circumferential direction of the film material, wherein the width and length of each gore are formed larger respectively and a length of a load tape is set to a size corresponding to the length of both side edge parts of the shape of the gores of the Natural-Shaped Balloon.

Then, both side edges of each gore are connected to the load tapes in a state that wrinkles are formed uniformly in a shortened state on both side edges in the length corresponding to the length of the load tape, and that the film material of each gore swells toward the outside between adjacent load tapes when a gas is filled into the gas bag.

Accordingly, although each gore is set to have a larger width and a larger length than those of the gore of the Natural-Shaped Balloon, the load tape has a size equal to the circumferential length of both side edge parts of the Natural-Shaped Balloon, these surplus portions of the gore swell out in the circumferential direction and the vertical direction of the gas bag as described above. Therefore, the radius of curvature of the part of each gore becomes smaller and the pressure resistance against the internal pressure improves further. Further, as each gore is configured by a single film piece having no connection line, the structure is simple and there is no increase in connection portion. As a result, there is no potential of bringing about an increase in the weight of the balloon or increase in the manufacturing processes, a reduction in the strength or a leakage of gas.

Further, according to another aspect of the invention, there is provided a method of manufacturing a super-pressure balloon, which comprises the steps of: cutting out a plurality of gores, each having a large width and a large length, based on the shape of the Natural-Shaped Balloon; disconnecting a load tape to have a length corresponding to a length of both side edge parts of the shape of the gores of the Natural-Shaped Balloon; and mutually connecting both side edge parts of the gores, and connecting both side edge parts to the load tape in a state that uniform wrinkles are formed in a shortened state on both side edge parts of each gore in a length corresponding to the length of the load tape. Accordingly, it is possible to easily manufacture a super-pressure balloon with swelled-out portions of the gores.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
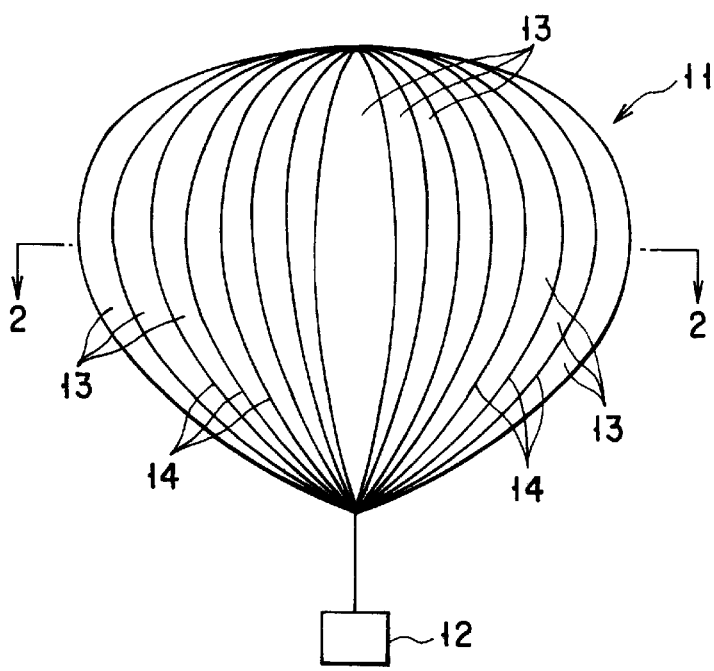
FIG. 1 is a schematic side view for showing a first embodiment of a balloon according to the present invention.

A balloon of the present invention and a manufacturing method thereof will be explained below with reference to FIGS. 1 to 8. FIGS. 1 to 4 show one embodiment of a super-pressure balloon according to the present invention, and this balloon is a large scientific observation balloon for flying in the stratosphere, for example.

In the drawings, a reference numeral 11 denotes a gas bag, and helium gas or the like is filled in this gas bag 11, to generate buoyancy. Payload including an observation device 12 and others is loaded in this gas bag 11. In the actual balloon, various kinds of control devices for carrying out discharge of the gas and dropping of ballast are mounted in the gas bag 11, but they are omitted from the drawings.

Figure 3:
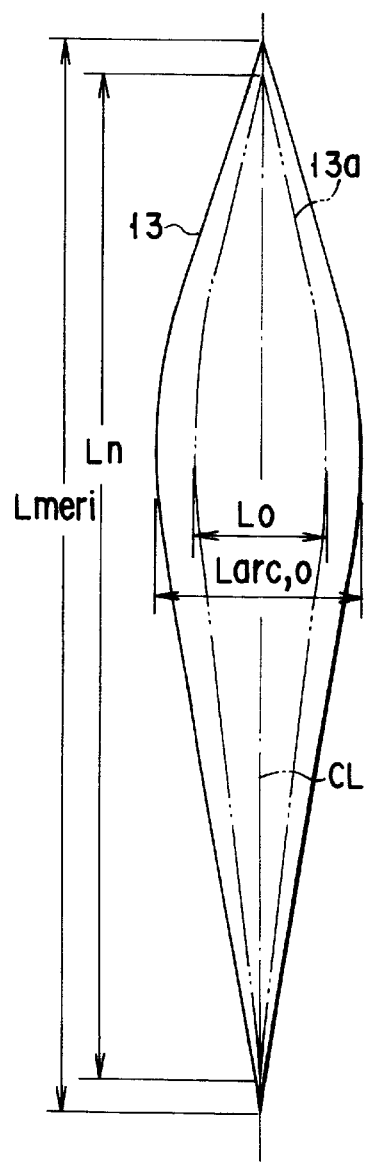
FIG. 3 is an exploded view of for showing a gore of the balloon shown in FIG. 1.

The gas bag 11 has a schematically spherical shape, and is structured by connecting a large number of gores 13 that are the gas bag vertically and equally divided into N spindle-shaped film pieces, as shown in FIG. 3. These gores 13 are formed by a light-weight and high-strength film material such as a woven cloth or a plastic film, with both side edge parts of the gores 13 connected together by sewing or by adhesion, thereby to structure the gas bag 11. Further, load tapes 14 that can endure a high tension are sewed or adhered to the gores 13 along the connection lines of these gores 13. These load tapes 14 increase the mutual connection strength of the gores 13, disperse the load of the observation devices 12 and others and transmit this load to the gores 13, and also maintain the shape of the gas bag 11 in a predetermined shape.

Figure 4:
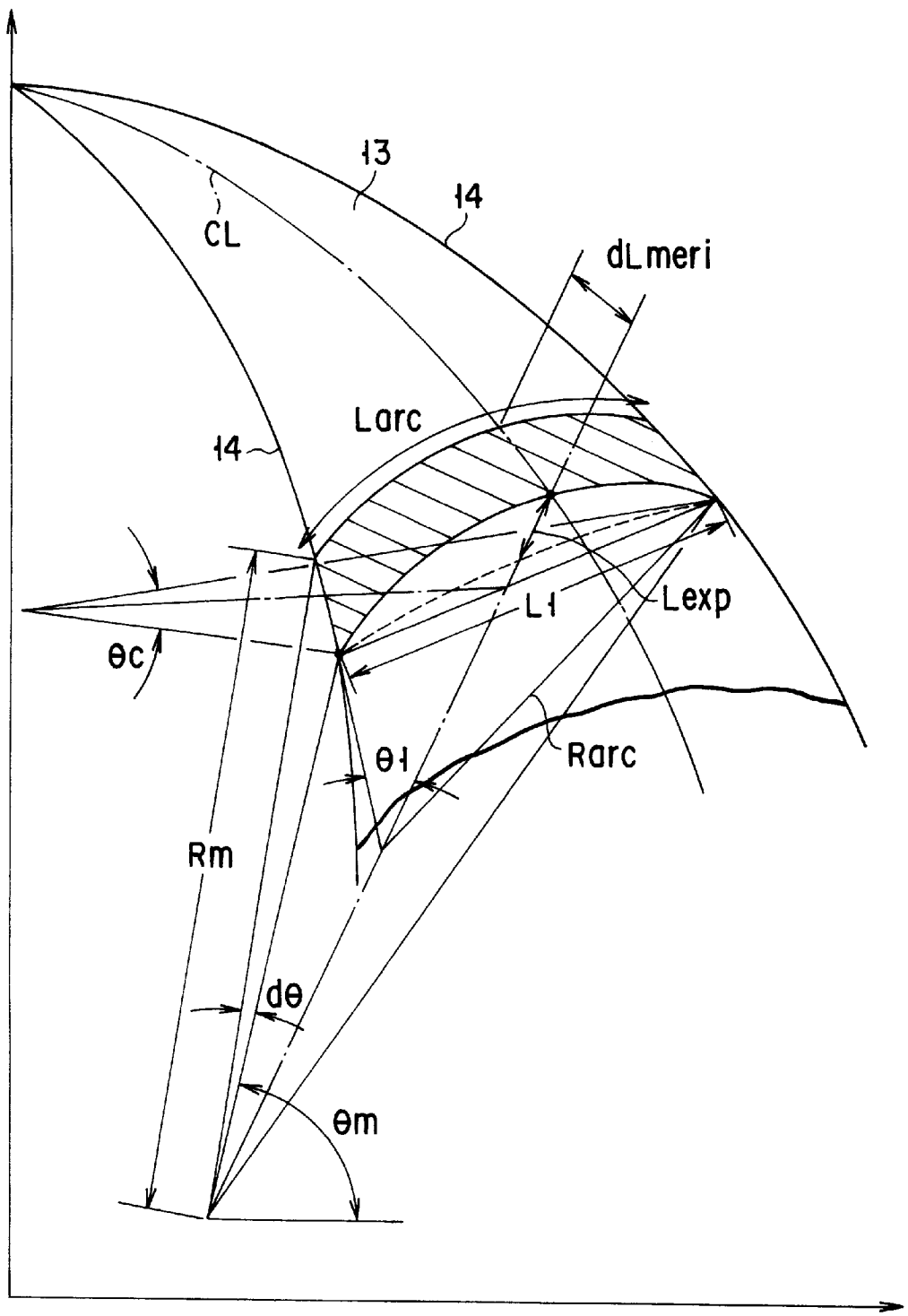
FIG. 4 is a schematic perspective view for showing a size relationship of each part of the gore.

In the present invention, each gore 13 is formed in a shape as shown in FIG. 4. In FIG. 3, a shape 13a expressed by two-dot chain lines shows a shape of the gore of the above-described Natural-Shaped Balloon, and this shape has a length Ln in its vertical direction and a width L0.

Then, each gore 13 of the balloon according to the present invention is set to have a width Larc,0 larger than the width L0 of the shape 13a of the gore of the Natural-Shaped Balloon, and each gore 13 of the balloon according to the present invention is set to have a length Lmeri larger than the length Ln of the shape 13a of the gore of the Natural-Shaped Balloon.

Further, the length of each load tape 14 is set equal to the circumferential length of the side edge part of the shape 13a of the Natural-Shaped Balloon. The gore 13 of the present invention has its both side edge parts connected together, and is connected to the load tape 14 in a state that the circumferential length of both side edge parts is shortened uniformly to have a length equal to that of the load tape 14.

Figure 2:
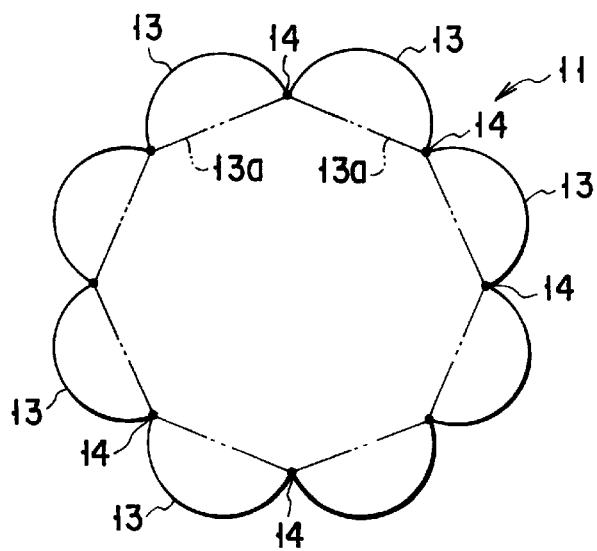
FIG. 2 is a schematic cross-sectional view taken along line 2—2 of FIG. 1.

FIG. 2 shows a schematic cross-sectional shape of the gas bag 11 of this balloon taken along line 2—2 of FIG. 1. As described above, when it is assumed that each gore is a gore of the Natural-Shaped Balloon and has no expandability, this gore forms a polygonal shape as expressed by the two-dot lines 13a in FIG. 2. However, in the case of the present invention, as the width Larc,0 of each gore 13 is formed larger than the width L0 of the shape 13a of the Natural-Shaped Balloon, each gore 13 swells toward the outside in approximately an arch shape by a volume corresponding to a surplus portion of the gas bag 11 due to the internal pressure of the gas bag 11. Thus, the radius of curvature becomes smaller.

As each gore 13 swells out, the center part of each gore 13 swells toward the outside within a plane including the meridian of this gas bag 11. However, each gore 13 is formed to have the length Lmeri larger than the length Ln of the shape 13a, of the Natural-Shaped Balloon by the size corresponding to this swell-out volume.

In actual practice, a film material for structuring these gores 13 has expandability, and therefore, each gore 13 swells toward the outside by the expansion of this film material itself as well as by the surplus portions of the width and length of the gore 13. In the present embodiment, preferably each gore swells out in approximately a semi-circular shape between adjacent load tapes 14 at a portion corresponding to a position of a maximum radius of the gas bag 11. Therefore, the radius of curvature becomes a minimum in this swell-out state, and no more swell-out is necessary.

Further, in the present embodiment, when the film material of each gore 13 is swollen toward the outside as described above, the radius of curvature Rarc,0 of the swell-out at the position of the maximum radius becomes a maximum, and the tensile stress of the film material at this portion becomes a maximum and the compressive strength at this portion becomes a minimum.

Accordingly, when the radius of curvature Rarc,0 of this portion is set and a radius of curvature of a swell-out of the film material at any other optional position of each gore 13 is set Racc from the given conditions, that is, the tensile strength, the pressure tightness and other conditions of the film material, the following relationship is obtained:

$$R\text{ arc} \leq R\text{ arc},0 \tag{4}$$

Accordingly, the compressive strength at any other optional position does not become lower than at least the compressive strength at the portion of the maximum radius. Therefore, when the shape of the gore 13 is determined so as to satisfy the condition of the expression (4), it is not necessary to calculate each compressive strength at any optional position of the gore 13. As a result, it becomes easy to design the gore and it also becomes possible to securely guarantee the reliability of the compressive strength of the whole gas bag.

Further, when the shape of the gore 13 is set optionally within the range of satisfying the above conditions, at least the compressive strength can be guaranteed. Therefore, it becomes possible to set the shape of the gores 13 according to the convenience of manufacturing and other conditions, thereby improving the degree of freedom of design.

Further, it is most reasonable to have tension generated equally and uniformly in the film material at each portion of each gore 13 that structures the gas bag 11. In this way, it becomes possible to provide the balloon with the smallest weight and high pressure tightness.

In the present embodiment, the shape and other conditions of each gore 13 are set optimum as described above. A relationship between the shape of the gore 13 and the radius of curvature of the swell-out of the film material etc. will be explained below with reference to FIG. 4.

FIG. 4 schematically illustrates an optional fine part of the gore 13. It is assumed that Rm represents a radius of curvature of a swell-out of the film material at a fine portion at this optional position, θm represents a slope angle of the radius of curvature, and N represents the number of the load tapes 14, that is, the number of the gores 13. Then, in each part of the gore 13, when a maximum radius of the gas bag 11 is Xmax, the radius of curvature Rarc,0 at a portion where the radius of curvature becomes a maximum is given as follows:

$$R\text{ arc},0 \geq X\text{ max} \cdot \pi/N \tag{5}$$

When a height position, or a position in a vertical direction, is Y0, a pressure P acting upon the film material at any optional position in a vertical direction is given, in a similar manner to the expression (2), as follows:

$$P = P0 + d\rho \cdot g \cdot Y0 \tag{2'}$$

In this case, when the tension in a meridian direction or a vertical direction of the film material is sufficiently small, the radius of curvature Rarc for making constant the tension of the film material at any optional position Y in a vertical direction becomes as follows:

$$R\text{ arc} \cdot (P0 + d\rho \cdot g \cdot Y) = R\text{ arc},0(P0 + d\rho \cdot g \cdot Y0) \tag{6}$$

Therefore, the following relationship is obtained:

$$R\text{ arc} = R\text{ arc},0 \cdot (P0 + d\rho \cdot g \cdot Y0)/(P0 + d\rho \cdot g \cdot Y) \tag{7}$$

In the actual balloon, the film material used has some expandability, and therefore, the sizes given by the above expressions do not necessarily represent exact sizes of the balloon. However, in general, the radius of curvature Rarc of a portion of each gore 13 may be gradually smaller from the lower part toward the upper part of the gas bag 11, as is clear from the above expression (7), and it is also preferable to have an exploded top plan shape of each gore 13 set according to these characteristics.

Further, the width of each part of the exploded shape of the gore 13 is a length of an arc of the film material swollen out by the radius of curvature obtained from the above relationships, and the length Larc of the arc is given as follows:

$$L\text{ arc} = 2 \cdot R\text{ arc} \cdot \theta 1 \tag{8}$$

A height of the swell-out Lexp from the center line of the gore 13 of the shape of the Natural-Shaped Balloon when the gore 13 has swollen out in a predetermined radius of curvature in a circumferential direction, is given as follows:

$$L\text{ exp} = R\text{ arc} \cdot (1 - \cos(\theta 1)) \tag{9}$$

In this case, θ1 is ½ of an angle formed by the radius of curvature Rarc between adjacent load tapes, and θ1 is given as follows:

$$\theta 1 = \sin^{-1}(L1/R\text{ arc}) \tag{10}$$

In this case, L1 is ½ of a distance in a circumferential direction between the load tapes, and when a radius of the gas bag at this position is X, L1 is given as follows:

$$L1 = X \cdot \pi/N \tag{11}$$

Accordingly, when each part of the gore 13 has swollen out in the circumferential direction, an increment dLmeri of the length of a center line CL in the meridian direction of the gore 13 for a fine angle dθm of the slope angle θm at this fine portion, is given as follows:

$$dL\text{meri} = (L\text{ exp} + Rm) \cdot d\theta m \tag{12}$$

Accordingly, a length Lmeri of the center line CL of the gore 13 in this case can be obtained by the following expression by integrating the above expression from the lower part to the top part of the gas bag:

$$L\text{meri} = \int (L\text{ exp} + Rm) \cdot d\theta m \tag{13}$$

As explained above, when the length of the center line CL of each gore 13 is set corresponding to the radius of curvature in the circumferential direction of the gore 13, there is generated no unreasonable tension in the vertical direction of the gore 13 when the gore 13 has swollen out. Therefore, when the gore 13 is set in the shape and sizes as described above, each part of the gore 13 has uniform tension over the whole directions, and has an optimum shape with the highest compressive strength and the smallest weight.

As explained above, according to the gas bag 11 of the balloon, the gore 13 for structuring this gas bag 11 has its width and length set larger than the width and length of the shape of the gore of the Natural-Shaped Balloon. Accordingly, it is possible to make the gore 13 swell out to a large extent without essentially depending on the expansion of the film material. Therefore, the radius of curvature can be made smaller and the gas bag 11 can bear a higher internal pressure.

Further, as explained above, as the swell-out volume of the gore 13 does not basically depend on the expansion of the film material, it is possible to set optionally the swell-out volume based on the surplus of the width and the length of each gore. Accordingly, as shown in FIG. 2, it is possible to make each gore 13 swell out in approximately a semicircular shape and make minimum the radius of curvature and make maximum the pressure resistance of the gore 13.

Further, as each gore 13 is a single piece having no connection part, its structure is simple, with no increase in connection part. Therefore, the gore 13 does not bring about any inconvenience such as increase in weight, increase in manufacturing processes, reduction in strength and a risk of leakage, etc.

As explained above, as the film material of the actual balloon expands, it is preferable to design the balloon by taking this expansion of the film material into account in the above shape and size relationships. In this case, it is needless to mention that the above shape and size relationships should be followed by merely taking account of the expansion rate of the film material.

In the above-described balloon, as the circumferential length of both side edge parts of each gore 13 becomes larger than the length of the load tape 14, there arise wrinkles at both side edge parts of the gore 13 at the time of connecting the gores 13 with the load tapes 14 by sewing or by adhesion. Therefore, a special connection work is necessary.

Figure 5:
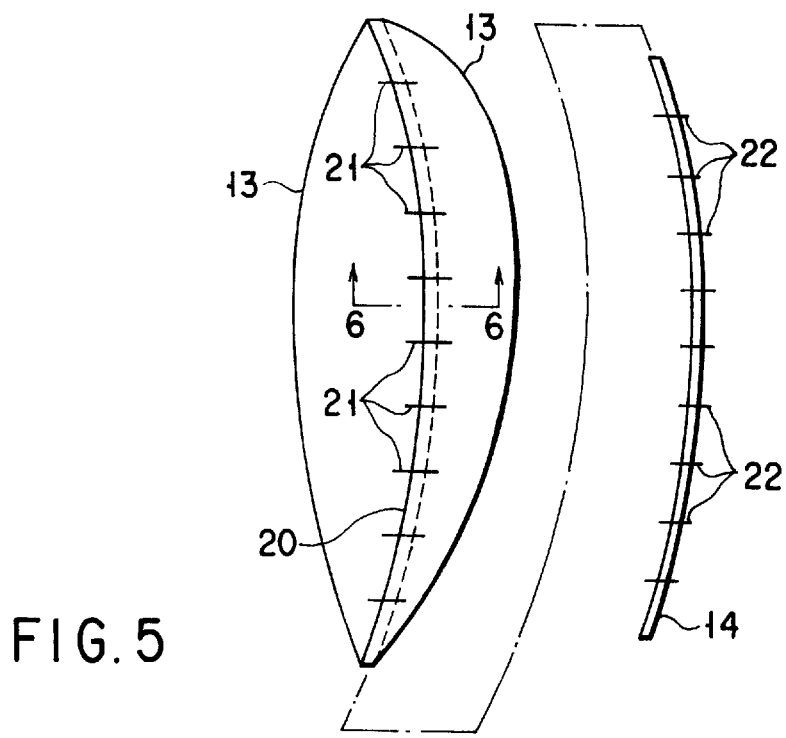
FIG. 5 is an explanatory view for showing a first embodiment of a manufacturing method according to the present invention.
Figure 6:
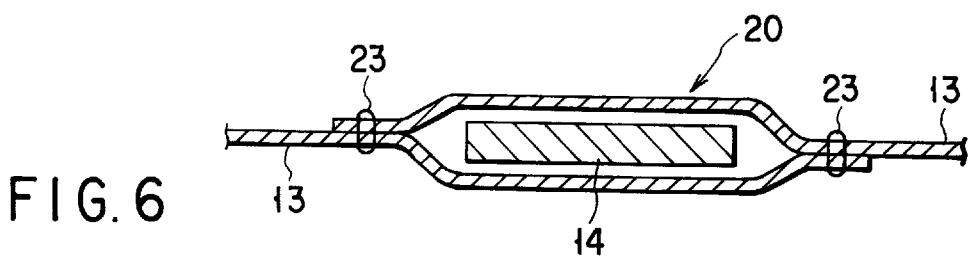
FIG. 6 is a cross-sectional view taken along line 6—6 of FIG. 5.

A method of manufacturing the gas bag 11 of the balloon by connecting the gores with the load tapes will be explained next. FIGS. 5 and 6 show a first embodiment of a manufacturing method, which is suitable for connecting the gores 13 by sewing.

According to this method, at first, in connecting side edge parts of two gores 13, the edge parts are superimposed and sewed together along two-row sewing lines 23, thereby to form a bag-shaped part 20, as shown in FIG. 5.

Next, a scale 21 is marked on this bag-shaped part 20 with equal intervals, and also a scale 22 is marked on the load tape 14 with equal intervals. The intervals of the scale 21 and the scale 22 respectively are set to correspond to the ratio of the length of the load tape 14 to the circumferential length of the side edge parts of the gore 13, that is, a reduction rate.

Next, this load tape 14 is inserted into the bag-shaped part 20. Then, this bag-shaped part 20 is shortened to make the scale 21 coincide with the scale 22 of the load tape 14. Thus, the bag-shaped part 20 at the edge part of the gore 13 is uniformly shortened to have a length equal to the length of the load tape 14.

Next, the portions on the scale 21 are shortened uniformly so as to have uniform fine wrinkles formed on the film material of the bag-shaped part 20. Then, this bag-shaped part 20 and the load tape 14 are sewed together.

As described above, when the reduction rate of the bag-shaped part 20 is small, the fine wrinkles formed on the film material of the bag-shaped part 20 are sewed in dispersion within each seam and large wrinkles are not sewed into seams. Depending on the case, the bag-shaped part 20 and the load tape 14 may not be sewed continuously but may be sewed intermittently so that wrinkles or loose parts of the film material may be formed at portions not sewed together.

According to this method, the side edge parts of the gore 13 are sewed into a bag-shape in a state that these parts are not shortened, and the load tape 14 is inserted into the bag-shaped part 20 thus formed, then the bag-shaped part 20 is shortened and is then sewed together with the load tape 14. Therefore, this is an easy work.

Figure 7:
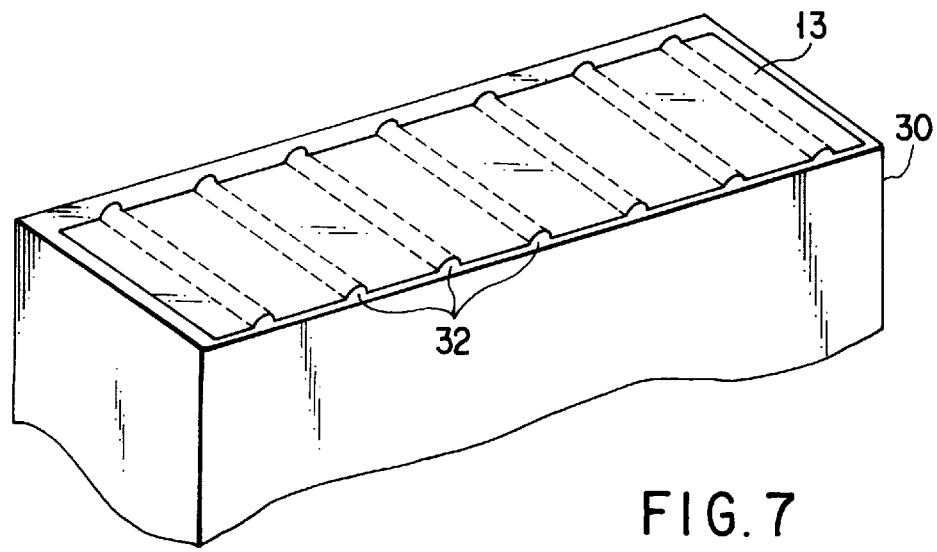
FIG. 7 is an explanatory view for showing a work stand to be used in a second embodiment of a manufacturing method according to the present invention.
Figure 8:
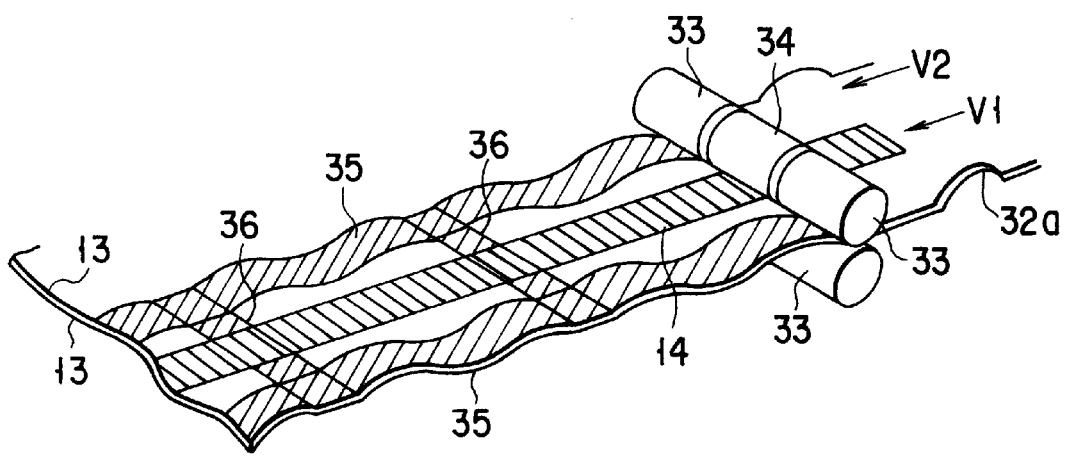
FIG. 8 is an explanatory view for showing the second embodiment of a manufacturing method according to the present invention.

FIGS. 7 and 8 show a second embodiment of the present invention. This method is suitable for connecting the gores prepared by a film material of a plastic film or the like, for example, by adhesion or by melting.

At first, a work stand 30 as shown in FIG. 7 is prepared. A plurality of bar-shaped spacers 32 are installed at equal intervals on the upper surface of this work stand 30. These spacers 32 can be taken out in their longitudinal directions. Then, a part of the gore 13 is mounted on this work stand 30. In this case, the film material of the gore 13 is bent in a waveform corresponding to the spacers 32 and is provided with predetermined looseness.

Next, two gores 13 and the load tape 14 mounted on the work stand 30 are sequentially connected by using rollers as shown in FIG. 8. In other words, the edge parts of the two gores 13 are superimposed and are connected together along two-row connection lines 35 of adhesion lines or melting lines. Then, the load tape 14 is disposed between the connection lines 35. The load tape 14 and the film material of the gores 13 are connected together by adhesion or by melting.

In this case, the portions of the two connection lines 35 are sandwiched and held between a pair of rollers 33 respectively. The portion of the load tape 14 is also sandwiched and held between a pair of rollers 34. Then, by rotating the rollers 33 and 34, portion of the load tape 14 and the portions of the connection lines 35 of the film material of the gores 13 are forwarded at speeds of V1 and V2 respectively.

The forwarding speed V1 of the portion of the load tape 14 and the forwarding speed V2 of the portions of the connection lines 35 are set corresponding to the ratio of the length of the load tape 14 to the circumferential length of the side edge parts of the gores 13, that is, the reduction rate of the connection. The forwarding speed V2 of the portions of the connection lines 35 is faster.

Accordingly, wrinkles or looseness occurs continuously at the portions of the connection lines 35 of the film material, and the surplus portion of the film material of the edge parts of the gores 13 is uniformly dispersed to the load tape 14. Finally, both ends of the load tape 14 coincide with both ends of the edge parts of the gores 13.

According to this method, the film material of the gores 13 and the load tape 14 are integrally connected by adhesion or by melting or the like, while sequentially providing uniform wrinkles or looseness to the film material from the end part, as shown in FIG. 8.

In this case, as described above, as looseness 32a is provided to the film material of the gores 13 by the spacers 32 on the work stand 30, other parts are not pulled out when the film material . As forwarded fast as explained above. As the spacers 32 are sequentially pulled out along with the proceeding of this connection, they do not interfere with the operation.

Further, according to this embodiment, the gores 13 and the load tape 14 are intermittently connected at connection portions 36, and the wrinkles or looseness of the gores 13 is uniformly formed at these connection portions. When the reduction rate of the edge parts of the gores 13 is set smaller, it is of course possible to form fine wrinkles or looseness on the film material of the gores 13 and seal the wrinkles or looseness into the connection part by dispersion, as described above.

According to this method, as the gores 13 are sequentially connected with the load tape 14 while sequentially forming uniform wrinkles or looseness on the edge parts of the gores 13, the manufacturing is efficient.

In the case of the above-described manufacturing method, it is also good to arrange such that the edge parts of adjacent two gores 13 are connected in advance without generating wrinkles, and thereafter the gores 13 are connected with the load tape 14 either intermittently or continuously while forming wrinkles or looseness on the edge parts of the gores. The edge parts of the gores 13 and the load tape 14 may also be connected at the same time, as described above.

Further, the gores 13 and the load tape 14 may also be connected together by sandwiching the load tape 14 between the edges of the gores 13. Furthermore, the gores 13 and the load tape 14 may also be connected together by sandwiching the connection part of the edge parts of the gores between the two load tapes. Further, the gores 13 and the load tape 14 may also be connected together by disposing the load tape on one surface side of the connection part of the edge parts of the gores.

Figure 9:
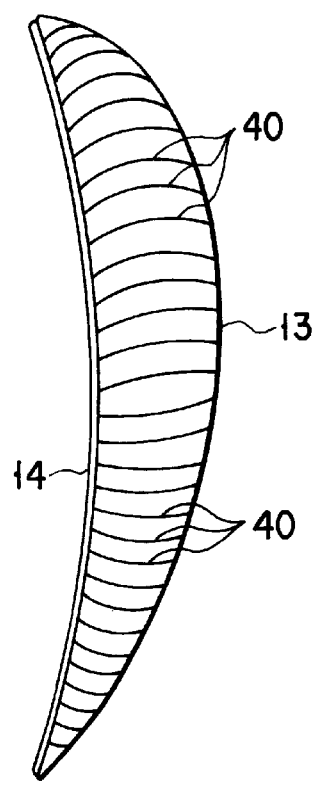
FIG. 9 is a perspective view for showing a gore of a second embodiment of a balloon according to the present invention.

The present invention is not limited to the above embodiment. For example, FIG. 9 shows the gore 13 of a second embodiment of a balloon of the present invention. The gore 13 of the present embodiment has a length in its longitudinal direction set larger than a value obtained from the above expression (13).

By setting sizes of the gore 13 in this way, looseness is generated in the vertical direction of the gore 13 and continuous lateral wrinkles 40 are formed across the gore 13 as shown in FIG. 9. Accordingly, when the film material of the gores 13 expands by the internal pressure of the gas bag structured by these gores 13, there is generated no tension within the gores 13 in their vertical directions.

Accordingly, in the case of designing these gores 13, only the tension in the lateral direction, that is, mainly the tension in a direction to bear the internal pressure may be considered. Thus, it becomes easy to design the gores. Further, as a film material for structuring these gores 13, it is possible to select a material having large strength in only the lateral direction, that is, a material having directivity in the strength. As a result, it is possible to provide a gas bag with lighter weight and with higher internal-pressure resistance.

Figure 10:
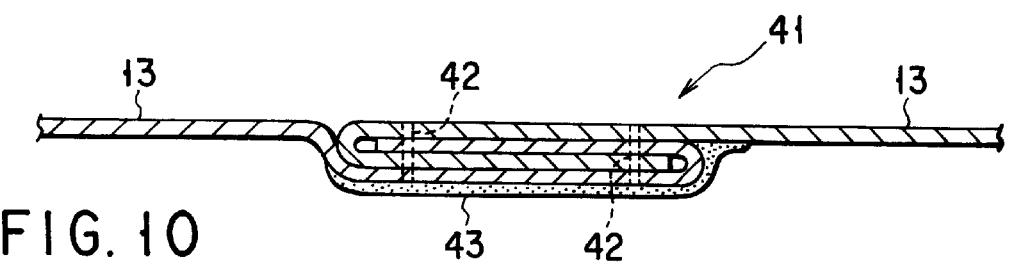
FIG. 10 is a cross-sectional view for showing a connection part of gores for explaining a process of a third embodiment of a manufacturing method according to the present invention.
Figure 11:
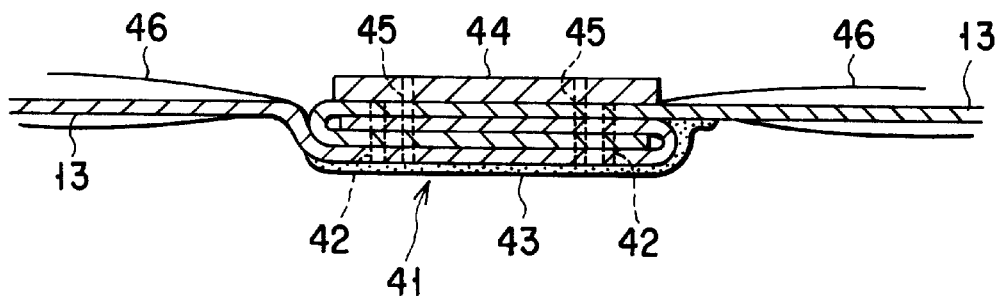
FIG. 11 is a cross-sectional view for showing a connection part of gores for explaining a process of the third embodiment of a manufacturing method according to the present invention.
Figure 12:
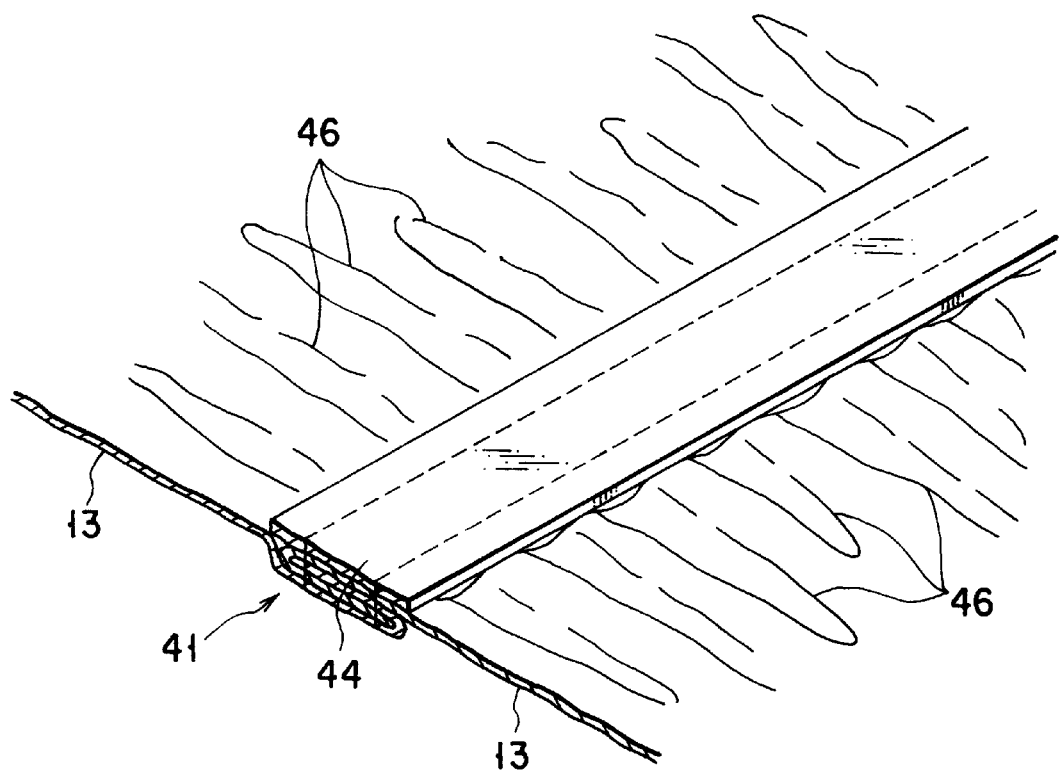
FIG. 12 is a cross-sectional view for showing a connection part of gores for explaining a process of the third embodiment of a manufacturing method according to the present invention.

FIGS. 10 to 12 show a third embodiment of a manufacturing method of a balloon according to the present invention. This embodiment relates to a manufacturing method for firmly and easily connecting the edge parts of gores with a load tape.

At first, as shown in FIG. 10, the edge parts of two gores 13 are mutually superimposed in a U-shape and are then sewed together in a state of not forming wrinkles. A reference numeral 42 denotes a seam. A sewed part 41 is provided with an airtight processing such as wet-preventing coating 43 or the like according to the need.

Next, as shown in FIG. 11, a load tape 44 is superimposed on the sewed part 41, and the load tape 44 and the sewed part 41 of the gores 13 are sewed together. A reference numeral 45 denotes a seam. In this case, for sewing the load tape 44 and the sewed part 41 together, a sewing machine having a wrinkle stitch function or a tucked stitch function (not shown) is used.

This kind of sewing machine has a function for differentiating the feed speed of an upper cloth and a feed volume of a lower cloth, and can set the feed volume of the lower cloth or the sewed part 41 of the gores 13 larger than the feed volume of the upper cloth or the load tape 44 corresponding to the ratio of the length of the upper cloth to the length of the lower cloth.

Accordingly, by carrying out the above-described sewing, it is possible to form uniform fine wrinkles 46 on the sewed part 41 of the gores 13 as shown in FIG. 12. Thereafter, the above-described airtight processing is carried out at the portion of the seam 45 according to the need.

According to the above-described method of the present embodiment, the edge parts of two adjacent gores 13 are sewed together in a state that no wrinkles are formed. Therefore, the strength of the sewing is high and the airtight processing is easy and secure.

In the above embodiment, the process of sewing the edge parts of adjacent gores 13 is carried out separately from the process of sewing the load tape 44. However, depending on the case, it is also possible to carry out these processes in one process, by superimposing the load tape 44 onto the superimposed edge parts of the adjacent gores 13, sewing these together by the above-described sewing machine, and forming the above-described uniform fine wrinkles on the superimposed portion of the gores 13.

Figure 13:
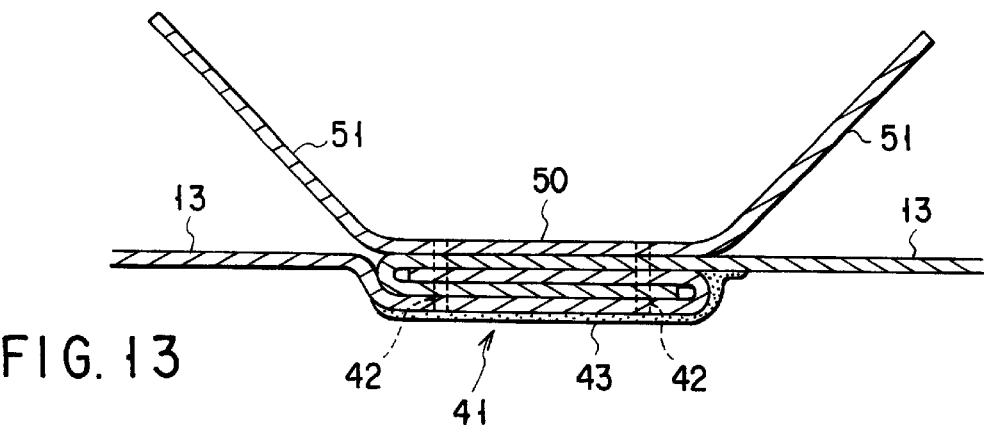
FIG. 13 is a cross-sectional view for showing a connection part of gores for explaining a process of a fourth embodiment of a manufacturing method according to the present invention.
Figure 14:
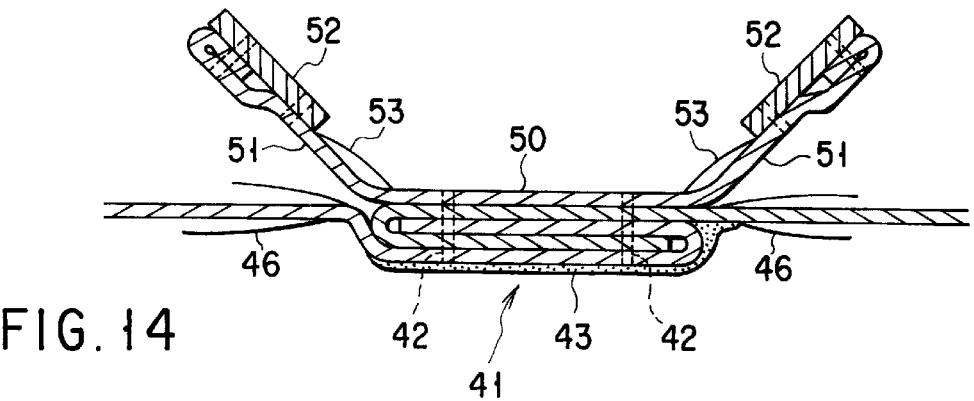
FIG. 14 is a cross-sectional view for showing a connection part of gores for explaining a process of the fourth embodiment of a manufacturing method according to the present invention.

FIGS. 13 and 14 show a fourth embodiment of a manufacturing method according to the present invention. The method of this embodiment is an improved method of providing a connection structure of the sewed part of the gores with the load tape.

At first, as shown in FIG. 13, the edge parts of adjacent gores 13 are sewed in a similar manner to the third embodiment of the manufacturing method, an auxiliary tape 50 is further superimposed on this sewed part 41, and this auxiliary tape 50 is sewed together with the edge parts of these gores 13. An airtight processing is also carried out to this sewed part according to the need.

The above auxiliary tape 50 is a belt-shaped tape formed by using, for example, the same material as the film material of the gores 13. The auxiliary tape 50 has its center part sewed and its both side edge parts formed as free edges 51. The auxiliary tape 50 has a length equal to the circumferential length of the edge parts of the gores 13, and the auxiliary tape 50 and the gores 13 are sewed together without forming wrinkles.

Next, as shown in FIG. 14, load tapes 52 are sewed at edge parts of the free edges 51 at both sides of the auxiliary tape 50. In this case, the sewing is carried out by differentiating the feed volume of the load tapes 52 and the feed volume of the free edges 51 of the auxiliary tape 50 corresponding to the ratio of the length of the load tape 52 to the length of the free edges 51, by using a similar sewing machine to that of the third embodiment of the manufacturing method.

Accordingly, based on this sewing, it is possible to form uniform and fine wrinkles 53 on the free edges 51 of the auxiliary tape 50. These wrinkles 53 are finally dispersed as wrinkles 46 of the edge parts of the gores 13 in a similar manner to that of the third embodiment of the manufacturing method.

According to this embodiment, it becomes easy to manufacture a balloon. As the balloon manufactured in this embodiment has free edges 51 of the auxiliary tape 50 between the sewed part 41 of the gores 13 and the load tape 52, it is possible to form uniform and reasonable wrinkles on both edge parts of the gores 13.

Further, as the balloon manufactured in this embodiment has the load tapes 52 disposed respectively at both sides of the sewed part 41 of the gores 13, the load working on the load tape is dispersed to the two load tapes. Accordingly, the load applied to the sewed part 41 of the gores 13 becomes simple, thereby facilitating the design. At the same time, the load applied to the sewed part 41 can be made smaller.

In the above embodiment, although the load tapes 52 are sewed respectively on both sides of the auxiliary tape 50, it is of course possible to sew the load tape on only one side of the auxiliary tape.

Further, in the above embodiment of the manufacturing method, although a sewing machine is used for sewing while forming wrinkles by differentiating the feed volumes of cloths at the time of sewing the load tape and the sewed part of the gores or the auxiliary tape, the sewing or connection in the manufacturing method of the present invention is not limited to the above.

For example, it is also good to arrange such that an expandable tape is stretched by applying tension to this tape and this tape is adhered to the portion sewed with the load tape, that is, the edge parts of the gores, the sewed part thereof, and the auxiliary tape, etc., and the tension is released thereafter to make the tape shrink, thereby to form uniform and fine wrinkles on the edge parts of the gores and the auxiliary tape, etc., and that thereafter the load tape is sewed with the gores by using a general sewing machine.

While a material having some level of expandability has conventionally been used for the load tape, it is also good to form the load tape by using a material that expands to some extent. Then, it can be arranged such that this load tape is stretched by applying tension to it, and in this state, the load tape is sewed with the sewed part of the gores or with the auxiliary tape without forming wrinkles. Thereafter, the tension of the load tape is released to make the load tape shrink, thereby to form uniform and fine wrinkles on the gores and the auxiliary tape.

In this case, as the load tape has some level of expandability, the load tape expands to some degree when the balloon flies at a high altitude and its internal stress works. Therefore, when the length of the load tape is set, it is of course necessary to take into account in advance the expansion of the load tape.

Figure 15:
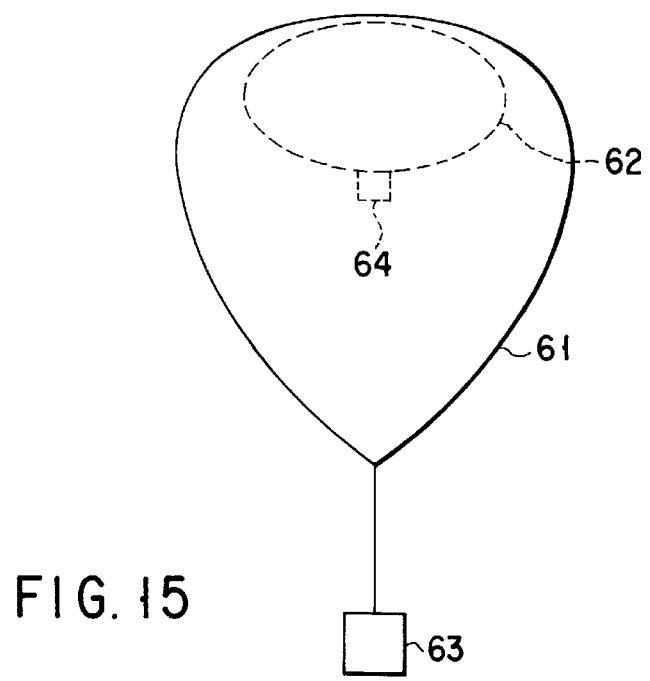
FIG. 15 is a schematic view for showing a third embodiment of a balloon according to the present invention.
Figure 16:
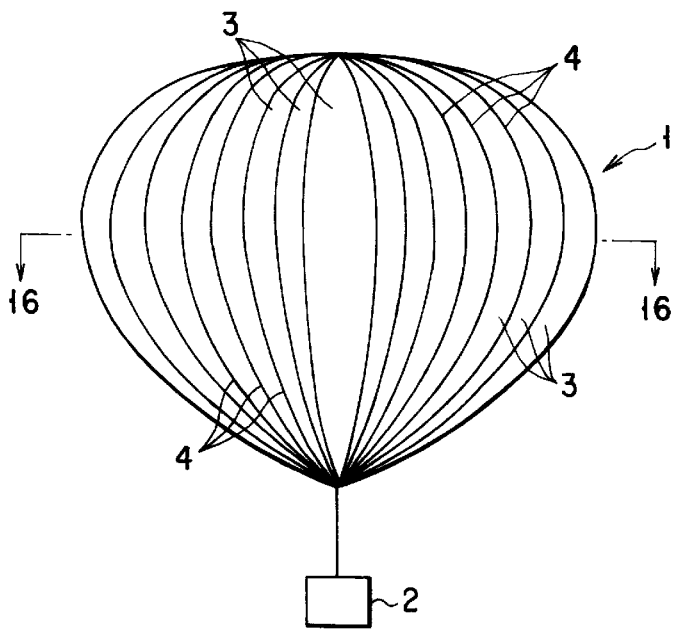
FIG. 16 is a schematic side view for showing a conventional balloon.
Figure 18:
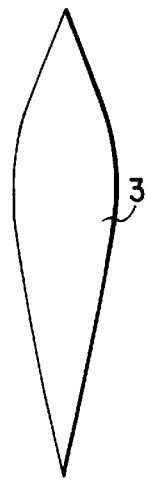
FIG. 18 is an exploded view for showing a gore of a conventional balloon.
Figure 17:
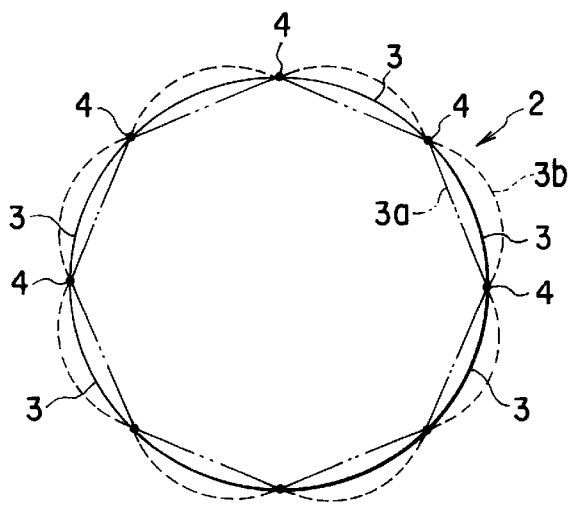
FIG. 17 is a schematic cross-sectional view taken along line 16—16 of FIG. 16.
Figure 19:
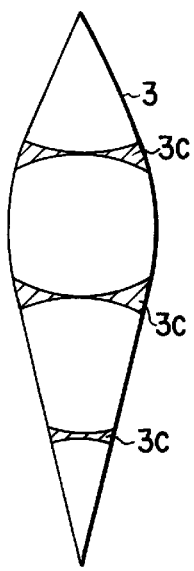
FIG. 19 is an exploded view for showing another gore of a conventional balloon.

FIG. 15 shows a third embodiment of a balloon according to the present invention. The balloon of this embodiment is a double-envelope type balloon having accommodated a pressure-resistant gas bag 62 such as the one as described above inside a normal non-pressure-resistant gas bag 61. Payload 63 is hung below this non-pressure-resistant gas bag 61.

According to this double-envelope type balloon, the buoyancy of the pressure-resistant gas bag 62 does not change when the gas inside the non-pressure-resistant gas bag 61 shrinks at night. As a result, there is small loss of the buoyancy in total. Accordingly, there is small change in the altitude of the balloon throughout the daytime and night time. When the capacity of the non-pressure-resistant gas bag 61 is set about five times the capacity of the pressure-resistant gas bag 62, for example, it is possible to restrict the change in the altitude between the daytime and the nighttime to about 2 to 3 km.

Further, as the double-envelope type balloon can support majority portions of the weight of the payload 63 by the buoyancy of the non-pressure-resistant gas bag 61, the total weight of the balloon becomes smaller than the total weight of the balloon in which the pressure-resistant gas bag is used for the whole gas bag. Accordingly, this balloon can fly to a higher altitude than the balloon that uses the pressure-resistant gas bag for the whole gas bag. Therefore, even when the altitude changes between the daytime and the nighttime, it is possible to obtain a higher altitude than the low altitude at night due to the altitude reduction. As a result, it becomes possible to carry the payload of an observation device and others to an area of a higher altitude.

Further, when a gas discharge valve mechanism 64 is provided inside the pressure-resistant gas bag 62 and a high-pressure gas within the pressure-resistant gas bag 62 is discharged within the non-pressure-resistant gas bag 61, it becomes possible to increase the buoyancy of this non-pressure-resistant gas bag 62. Accordingly, it is also possible to compensate for the reduction in the buoyancy at night thereby to control the altitude without dropping the ballast.

Further, according to this double-envelope type balloon, the load of the payload 63 does not work on the inside pressure-resistant gas bag 62. Therefore, this pressure-resistant gas bag 62 can be formed in more light weight and the internal gas pressure can be increased. Further, as the pressure-resistant gas bag 62 is compact, it is also possible to lower the total manufacturing cost of the balloon.

Further, according to the above-described double-envelope type balloon, as the external shape is similar to that of the single-envelope type balloon, the discharge work is easy. This balloon does not take complex behaviors against wind or other influences, and therefore, the balloon can be handled easily.

The present invention is not limited to the above-described embodiments. For example, the invention is not limited to the scientific observation balloon, but can also be applied to general balloons for other purposes.

As described above, although the balloon of the present invention has the width and the length of the gores set larger than those of the shape of the Natural-Shaped Balloon, the load tape has the length equal to the circumferential length of both side edge parts of the gores of the shape of the Natural-Shaped Balloon. Accordingly, each gore expands by this surplus portion both in the circumferential direction and in the vertical direction of the gas bag. As a result, the radius of curvature at each portion of each gore becomes smaller, and the pressure resistance against the internal pressure improves. Further, as each gore is configured by a single film piece having no connection line, the gore has a simple structure with no increase in connection portion. Therefore, the gore does not bring about increase in weight, increase in manufacturing processes, reduction in strength and a risk of leakage, etc.

Furthermore, according to the method of the present invention, it is possible to easily manufacture a pressure-resistant balloon with a swell-out of each gore as described above. Thus, the invention has a large effect.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A super-pressure balloon, equipped with a pressure-resistant gas bag prepared by a plurality of spindle-shaped gores formed by an airtight film material, with both side edge parts of the gores mutually connected together, and tension-resistant load tapes fitted to both side edge parts of the gores along connection lines of both side edge parts, the balloon capable of maintaining an internal gas pressure of the gas bag without discharging gas corresponding to an increase in buoyancy even after the gas bag has inflated to its maximum capacity, wherein based on a shape of a Natural-Shaped Balloon which is prescribed that tension is generated in only a vertical direction of a film material of the gas bag and no tension is generated in a circumferential direction, a width and a length of each gore are formed larger, a length of each load tape is set to a size corresponding to the length of both side edge parts of the shape of the gores of the Natural-Shaped Balloon, both side edges of each gore are connected to the load tapes in a state that wrinkles are formed uniformly in a shortened state on both side edges in the length corresponding to the length of the load tapes, and the film material of each gore swells toward the outside between adjacent load tapes when a gas is filled into the pressure-resistant gas bag.

2. A super-pressure balloon according to claim 1, wherein when Rarc,0 represents a radius of curvature of a swell-out of the film material toward the outside at a position Y0 of each gore corresponding to a position of a maximum radius of the gas bag, a radius of curvature Rarc of a swell-out of the film material toward the outside at any optional position of each gore is expressed by the following expression:

$$Rarc \leq Rarc,0.$$

3. A super-pressure balloon according to claim 1, wherein when dρ represents a difference between a density of gas inside the gas bag and a density of atmospheric air, P0 represents a bias pressure at a bottom of the gas bag, Rarc,0 represents a radius of curvature of a swell-out of the film material toward the outside at a position Y0 of each gore corresponding to a position of a maximum radius of the gas bag, and Y represents a position in a vertical direction of each gore, a radius of curvature Rarc of the film material at any optional position of each gore is expressed by the following expression:

$$Rarc = Rarc,0 \cdot (P0 + d\rho \cdot g \cdot Y0)/(P0 + d\rho \cdot g \cdot Y).$$

4. A super-pressure balloon according to claim 1, wherein when Rm represents a radius of curvature of a swell-out of the film material at any optional fine portion of each gore, θm represents a slope angle of a radius of curvature at this fine portion, Lexp represents a swell-out height of a swell-out of this fine portion, and dLmeri represents a fine increment of a length of a center line of the gore due to this swell-out, a length Lmeri of the center line of each gore is given by integration of the fine increment dLmeri from the bottom to the top of the gas bag, which is expressed by the following expression:

$$Lmeri = \int (Lexp + Rm) \cdot d\theta m.$$

5. A super-pressure balloon according to claim 1, wherein when Rm represents a radius of curvature of a swell-out of the film material at any optional fine portion of each gore, θm represents a slope angle of a radius of curvature at this fine portion, Lexp represents a swell-out height of a swell-out of this fine portion, and dLmeri represents a fine increment of a length of a center line of the gore due to this swell-out, a length Lmeri of the center line of each gore is larger than a length given by integration of the fine increment dLmeri from the bottom to the top of the gas bag which is expressed by the following expression:

$$Lmeri = \int (Lexp + Rm) \cdot d\theta m.$$

6. A super-pressure balloon according to claim 1, wherein the pressure-resistant gas bag is accommodated within a non-pressure-resistant gas bag, and payload is hung under this non-pressure-resistant gas bag.

7. A super-pressure balloon according to claim 6, wherein there is provided a gas discharge valve mechanism for discharging the gas within the pressure-resistant gas bag into the non-pressure-resistant gas bag.

8. A method of manufacturing a super-pressure balloon, equipped with a pressure-resistant gas bag prepared by a plurality of a spindle-shaped gores formed by an airtight film material, with both side edge parts of the gores mutually connected together, and tension-resistant load tapes fitted to both side edge parts of the gores along connection lines of both side edge parts, the balloon capable of maintaining an internal gas pressure of the gas bag without discharging gas corresponding to an increase in buoyancy even after the gas bag has inflated to its maximum capacity, the manufacturing method comprising the steps of:

cutting out a plurality of gores, each having a larger width and a larger length than those of a shape of the Natural-Shaped Balloon;

disconnecting the load tapes to have a length corresponding to a length of both side edge parts of the shape of the gores of the Natural-Shaped Balloon; and mutually connecting both side edge parts of the gores, and connecting both side edge parts to the load tapes in a state that uniform wrinkles are formed in a shortened state on both side edge parts of each gore in a length corresponding to the length of the load tapes.

9. A method of manufacturing a super-pressure balloon according to claim 8, wherein the step of connecting both side edge parts of the gores with the load tapes includes the steps of:

mutually connecting both side edge parts of the gores together, and forming a bag-shaped part into which the load tape can be inserted along a connection part of both side edge parts;

inserting the load tape into the bag-shaped part;

uniformly forming wrinkles and shortening the wrinkles in a length equal to a length of the load tape inserted in the bag-shaped part; and connecting the bag-shaped part with the load tape.

10. A method of manufacturing a super-pressure balloon according to claim 8, wherein the step of connecting both side edge parts of the gores with the load tapes is the step of connecting both side edge parts of the gores with the load tapes while forming uniform wrinkles by shortening both side edge parts by predetermined volume.

11. A method of manufacturing a super-pressure balloon according to claim 8, wherein the step of connecting both side edge parts to the load tapes in a state that uniform wrinkles are formed in a shortened state on both side edge parts of each gore in a length corresponding to the length of the load tapes is the step of intermittently connecting both side edge parts of the gores with the load tapes and forming the wrinkles at these intermittent connection portions on both side edge parts of the gores.

12. A method of manufacturing a super-pressure balloon according to claim 8, wherein the step of connecting both side edge parts to the load tapes in a state that uniform wrinkles are formed in a shortened state on both side edge parts of each gore in a length corresponding to the length of the load tapes is the step of continuously connecting both side edge parts of the gores with the load tapes and sealing the wrinkles into the continuous connection portions on both side edge parts of the gores.

13. A method of manufacturing a super-pressure balloon according to claim 8, wherein the step of connecting both side edge parts to the load tapes in a state that uniform wrinkles are formed in a shortened state on both side edge parts of each gore in a length corresponding to the length of the load tapes is the step of sewing the load tapes and both edge parts of the gores together by differentiating the feed volume of the load tape and the feed volume of both side edge parts corresponding to the ratio of the lengths of the load tapes and both side edged parts.

14. A method of manufacturing a super-pressure balloon according to claim 8, wherein the step of connecting both side edge parts to the load tapes in a state that uniform wrinkles are formed in a shortened state on both side edge parts of each gore in a length corresponding to the length of the load tapes includes the steps of: applying tension to a tape having expandability and adhering this tape onto both side edge parts of the gores in a state that the tape is stretched; releasing the tension of the tape to shorten the tape thereby to form uniform wrinkles on the edge parts of the gores; and sewing the load tapes with the edge parts of the gores.

15. A method of manufacturing a super-pressure balloon according to claim 8, wherein the step of connecting both side edge parts to the load tapes in a state that uniform wrinkles are formed in a shortened state on both side edge parts of each gore in a length corresponding to the length of the load tapes includes the steps of: applying tension to the load tapes and sewing the load tapes with both side edge parts of the gores in a state that the load tapes are stretched; and releasing the tension of the load tapes to shorten the load tapes thereby to form uniform wrinkles on the edge parts of the gores.

16. A method of manufacturing a super-pressure balloon according to claim 8, wherein the step of connecting both side edge parts to the load tapes in a state that uniform wrinkles are formed in a shortened state on both side edge parts of each gore in a length corresponding to the length of the load tapes includes the steps of: sewing an auxiliary tape with the edge parts of the gores; and sewing the load tapes with this sewed edge parts together in a state that wrinkles are formed uniformly on the auxiliary tape.

* * * * *